United States Patent
Siraux et al.

(10) Patent No.: US 8,987,389 B2
(45) Date of Patent: Mar. 24, 2015

(54) PROCESS FOR PREPARING POLYOLEFINS AND USE OF ANTIFOULING AGENTS THEREIN

(75) Inventors: Daniel Siraux, Naast (BE); Daan Dewachter, Mechelen (BE)

(73) Assignee: Total Research & Technology Feluy, Seneffe (Feluy) (BE)

( * ) Notice: Subject to any disclaimer, the term of this patent is extended or adjusted under 35 U.S.C. 154(b) by 128 days.

(21) Appl. No.: 13/812,781

(22) PCT Filed: Jul. 29, 2011

(86) PCT No.: PCT/EP2011/063147
§ 371 (c)(1),
(2), (4) Date: Jan. 28, 2013

(87) PCT Pub. No.: WO2012/013805
PCT Pub. Date: Feb. 2, 2012

(65) Prior Publication Data
US 2013/0123443 A1    May 16, 2013

(30) Foreign Application Priority Data
Jul. 30, 2010    (EP) .................................. 10171363

(51) Int. Cl.
| | | |
|---|---|---|
| *C08F 2/00* | (2006.01) |
| *C08F 4/00* | (2006.01) |
| *C08F 2/01* | (2006.01) |
| *B01J 8/10* | (2006.01) |
| *B01J 19/18* | (2006.01) |
| *C08F 210/16* | (2006.01) |
| *C08F 4/6592* | (2006.01) |

(52) U.S. Cl.
CPC ... *C08F 2/01* (2013.01); *B01J 8/10* (2013.01); *B01J 19/1837* (2013.01); *C08F 210/16* (2013.01); *B01J 2208/00707* (2013.01); *B01J 2219/0004* (2013.01); *B01J 2219/00247* (2013.01); *C08F 4/6592* (2013.01); *C08F 2410/02* (2013.01)
USPC .............................. 526/64; 526/89

(58) Field of Classification Search
CPC .......... C08F 210/16; C08F 2/01; C08F 2/005; C08F 2/14; C08F 2410/02; C08F 4/6592; C08F 210/14; C08F 2500/24; B01J 19/1837; B01J 8/10; B01J 2219/0004; B01J 2219/00247; B01J 2208/00707
USPC ....................................... 526/64, 89
See application file for complete search history.

(56) References Cited

U.S. PATENT DOCUMENTS

| | | |
|---|---|---|
| 2005/0165181 A1 | 7/2005 | Tharappel et al. |
| 2008/0114135 A1 | 5/2008 | Tharappel et al. |

FOREIGN PATENT DOCUMENTS

| | | |
|---|---|---|
| EP | 1 316 566 A2 * | 6/2003 |
| EP | 2192133 A1 | 6/2010 |
| KR | 2000-0039597 | 7/2000 |
| WO | 2009010413 A1 | 1/2009 |

OTHER PUBLICATIONS

Office Action issued in Korean Patent Application No. 2013-7005081, dated Dec. 18, 2014 (10 pages).

* cited by examiner

*Primary Examiner* — William Cheung

(57) ABSTRACT

The present invention relates to a process of preparing a polyethylene in a loop reactor in the presence of antifouling agent comprising the steps of:
a) feeding into said loop reactor diluent, monomers, optionally hydrogen, and optionally one or more co-monomers to produce a liquid phase;
b) introducing antifouling agent into said loop reactor,
c) introducing a catalyst into the liquid phase to produce a slurry; and
d) polymerizing the monomers and optional co-monomers to form the polyethylene, characterized in that the time difference between introduction of the antifouling agent and introduction of the catalyst is at most 3 hours.

6 Claims, 2 Drawing Sheets

PROCESS FOR PREPARING POLYOLEFINS AND USE OF ANTIFOULING AGENTS THEREIN

CROSS-REFERENCE TO RELATED APPLICATIONS

This application claims the benefit of PCT/EP2011/063147, filed Jul. 29, 2011, which claims priority from EP 10171363.4, filed Jul. 30, 2010.

TECHNICAL FIELD

The present invention relates to processes for the preparation of polyolefins and the use of antifouling agents therein.

BACKGROUND OF THE INVENTION

Polyolefins, such as polyethylene (PE), are synthesized by polymerizing monomers, such as ethylene ($CH_2=CH_2$). Because it is cheap, safe, stable to most environments and easy to be processed, polyolefins are useful in many applications. Polyethylene can be classified into several types, such as but not limited to LDPE (Low Density Polyethylene), LLDPE (Linear Low Density Polyethylene), and HDPE (High Density Polyethylene) as well as High Molecular Weight (HMW), Medium Molecular Weight (MMW) and Low Molecular Weight (LMW). Each type of polyethylene has different properties and characteristics.

Olefin (such as ethylene) polymerizations are frequently carried out in a loop reactor using monomer (such as ethylene), diluent and catalyst, optionally an activating agent, optionally one or more co-monomer(s), and optionally hydrogen.

Polymerization in a loop reactor is usually performed under slurry conditions, with the produced polymer usually in a form of solid particles suspended in diluent. The slurry is circulated continuously in the reactor with a pump to maintain efficient suspension of the polymer solid particles in the liquid diluent. Polymer slurry is discharged from the loop reactor by means of settling legs, which operate on a batch principle to recover the slurry. Settling in the legs is used to increase the solid concentration of the slurry finally recovered as product slurry. The product slurry is further discharged through heated flash lines to a flash tank, where most of the diluent and unreacted monomers are flashed off and recycled.

Optionally, the product slurry may be fed to a second loop reactor serially connected to the first loop reactor wherein a second polymer fraction may be produced. Typically, when two reactors in series are employed in this manner, the resultant polymer product is a bimodal polymer product, which comprises a first polymer fraction produced in the first reactor and a second polymer fraction produced in the second reactor, and has a bimodal molecular weight distribution and density.

After the polymer product is collected from the reactor and the hydrocarbon residues are removed, the polymer product is dried, additives can be added and finally the polymer may be mixed and pelletized.

During the mixing step, polymer product and optional additives are mixed intimately in order to obtain a compound as homogeneous as possible. Preferably, mixing is done in an extruder wherein the ingredients are mixed together and the polymer product and optionally some of the additives are melted so that intimate mixing can occur. The melt is then extruded into a rod, cooled and granulated, e.g. to form pellets. In this form the resulting compound can then be used for the manufacturing of different objects.

It has been found on an industrial scale that polymer product may deposit on the walls of the polymerization reactor. This so-called "fouling" is often caused in part by fines and build-up of electrostatic charge on the walls on the reactor. Antifouling agent is added to the polymerization medium and well-dispersed in advance to avoid such fouling during slurry polymerization.

Complications may occur during production of polyolefin, particularly polyethylene. Processing conditions, such as temperature and pressure, need to be well-controlled as otherwise suboptimal conditions may occur which could lead to less than optimal end-products. There remains a need in the art for an improved polyolefin production process, particularly for polyethylene, and especially to reduce production costs, control process conditions and/or produce optimal polymer end-products.

SUMMARY OF THE INVENTION

Surprisingly, the present inventors have found a way to improve polyolefin preparation processes and overcome one of more of the above problems of the prior art. Accordingly, the present invention relates to a process of preparing a polyolefin in a loop reactor in the presence of antifouling agent comprising the steps of:
 a) feeding into said loop reactor diluent, monomers, optionally hydrogen, and optionally one or more co-monomers to produce a liquid phase;
 b) introducing antifouling agent into said loop reactor,
 c) introducing a catalyst into the liquid phase to produce a slurry; and
 d) polymerizing the monomers and optional co-monomers to form the polyolefin,
characterized in that the time difference between introduction of the antifouling agent and introduction of the catalyst is at most 3 hours.

Preferably, the present invention provides a process of preparing polyethylene in a loop reactor in the presence of antifouling agent comprising the steps of:
 a) feeding into said loop reactor diluent, monomers, optionally hydrogen, and optionally one or more co-monomers to produce a liquid phase;
 b) introducing antifouling agent into said loop reactor,
 c) introducing a catalyst into the liquid phase to produce a slurry; and
 d) polymerizing the monomers and optional co-monomers to form the polyethylene,
characterized in that the time difference between introduction of the antifouling agent and introduction of the catalyst is at most 3 hours.

In an embodiment, the process is characterized in that in step c) the catalyst is introduced into the liquid phase when the concentration of antifouling agent is ranging from 0 to less than 0.3 ppm.

Surprisingly, the present inventors have found that presence of low levels of antifouling agent at initial introduction of the catalyst to the polymerization reactor according to the invention, results in quick start-up of the olefin polymerization reaction, reduced reactor down-time, high-quality end-product and/or reduced waste, in particular fines in the reactor and downstream of the reactor.

The above and other characteristics, features and advantages of the present invention will become apparent from the following detailed description, which illustrate, by way of example, the principles of the invention.

DETAILED DESCRIPTION OF INVENTION

Figure 1:
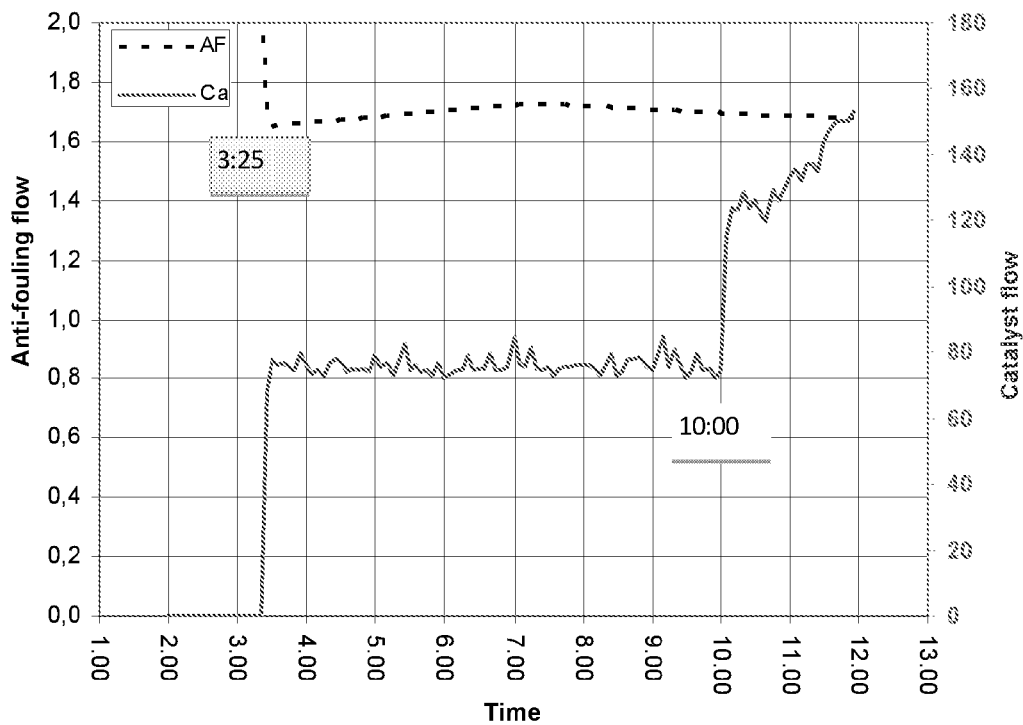
FIG. 1 represents a graph plotting the flow of catalyst and antifouling agent as a function of time in a polymerization reaction wherein the antifouling agent was injected 6 hours before the start of the catalyst injection.

Before the present method used in the invention is described, it is to be understood that this invention is not limited to particular methods, components, or devices described, as such methods, components, and devices may, of course, vary. It is also to be understood that the terminology used herein is not intended to be limiting, since the scope of the present invention will be limited only by the appended claims.

As used herein, the singular forms "a", "an", and "the" include both singular and plural referents unless the context clearly dictates otherwise.

The terms "comprising", "comprises" and "comprised of" as used herein are synonymous with "including", "includes" or "containing", "contains", and are inclusive or open-ended and do not exclude additional, non-recited members, elements or method steps.

The terms "comprising", "comprises" and "comprised of" also include the term "consisting of".

The recitation of numerical ranges by endpoints includes all numbers and fractions subsumed within the respective ranges, as well as the recited endpoints.

The term "about" as used herein when referring to a measurable value such as a parameter, an amount, a temporal duration, and the like, is meant to encompass variations of +/−10% or less, preferably +/−5% or less, more preferably +/−1% or less, and still more preferably +/−0.1% or less of and from the specified value, insofar such variations are appropriate to perform in the disclosed invention. It is to be understood that the value to which the modifier "about" refers is itself also specifically, and preferably, disclosed.

Unless otherwise defined, all terms used in disclosing the invention, including technical and scientific terms, have the meaning as commonly understood by one of ordinary skill in the art to which this invention belongs. By means of further guidance, definitions for the terms used in the description are included to better appreciate the teaching of the present invention.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to a person skilled in the art from this disclosure, in one or more embodiments. Furthermore, while some embodiments described herein include some but not other features included in other embodiments, combinations of features of different embodiments are meant to be within the scope of the invention, and form different embodiments, as would be understood by those in the art. For example, in the appended claims, any of the claimed embodiments can be used in any combination.

The present invention relates to a process of preparing a polyolefin in a loop reactor by introducing catalyst into a liquid phase of diluent, monomers, antifouling agent, optionally hydrogen, and optionally one or more co-monomers and preparing a slurry from said liquid phase by introducing catalyst. Upon introduction of the catalyst, the liquid phase contains only low levels of antifouling agent. The invention results in quick start-up of the olefin polymerization reaction, reduced reactor down-time, high-quality end-product and/or reduced waste The present invention relates a polyolefin preparation process, preferably a polyethylene preparation process wherein presence of low or no amounts of antifouling agent upon introduction of catalyst to the reactor.

Preferably, the polyolefin, and more preferably the polyethylene is produced in slurry conditions.

In an embodiment, the present invention relates to a process of preparing polyolefin, preferably a polyethylene, in a loop reactor in the presence of antifouling agent comprising the steps of:

a) feeding into said loop reactor diluent, monomers, optionally hydrogen, and optionally one or more co-monomers to produce a liquid phase;

b) introducing antifouling agent into said loop reactor, c) introducing a catalyst into the liquid phase to produce a slurry; and d) polymerizing the monomers and optional co-monomers to form the polyolefin, preferably the polyethylene, wherein in step c) the catalyst is introduced into the liquid phase when the concentration of antifouling agent is ranging from 0 to less than 0.3 ppm.

Preferably, the process further comprises the step of: e) subsequently increasing the concentration of antifouling agent.

According to the invention, the time difference between introduction of the antifouling agent and introduction of the catalyst is at most 3 hours, for example at most 2 hours, for example at most 1 hour, for example at most 50 min, preferably at most 40 min, preferably at most 30 min, more preferably at most 20 min and most preferably at most 10 min.

In an embodiment, antifouling agent is introduced in the loop reactor at most 3 hours before introduction of the catalyst of step c) in the liquid phase of step a), for example at most 2 hours, for example at most 1 hour, for example at most 50 min, preferably at most 40 min, preferably at most 30 min, more preferably at most 20 min and most preferably at most 10 min before introduction of the catalyst of step c) in the liquid phase of step a).

Preferably, antifouling agent is introduced in the loop reactor at least 1 minute before introduction of the catalyst of step c) in the liquid phase of step a), preferably at least 2 minutes, more preferably at least 3 minutes, for example at least 5 minutes, yet more preferably around 5 minutes before introduction of the catalyst of step c) in the liquid phase of step a), for example at least 1 minute and at most 40 min, preferably at most 30 min, more preferably at most 20 min and most preferably at most 10 min before introduction of the catalyst of step c) in the liquid phase of step a). Adding the antifouling agent just before the addition of the catalyst, allow to have a minimum of antifouling agent in the reactor to help the dispersion of the catalyst. At least 1 min before, allows to inject the minimum needed to use the antistatic effect of the antifouling agent and to help dispersing the catalyst (via the antistatic effect).

In another embodiment, antifouling agent is introduced in the loop reactor at most 1 hour after introduction of the catalyst of step c) in said liquid phase, for example at most 50 min, preferably at most 40 min, preferably at most 30 min, more preferably at most 20 min and most preferably at most 10 min after introduction of the catalyst of step c) in said liquid phase.

In another embodiment, antifouling agent is introduced in the loop reactor at least 1 minute after introduction of the catalyst of step c) in said liquid phase, for example at least 2 minutes, for example at least 3 minutes, for example at least 5 minutes, preferably at least 1 min and at most 40 min, preferably at most 30 min, more preferably at most 20 min and most preferably at most 10 min after introduction of the catalyst of step c) in said liquid phase.

The present inventors have surprisingly found that such time differences minimize undesired interactions and result in quick start-up of the olefin polymerization reaction, reduced reactor down-time, high-quality end-product and/or reduced waste, in particular fines.

Preferably, the process steps of the present invention represent consecutive steps. In step a), the liquid phase is prepared by feeding diluent, monomers, optionally hydrogen, and optionally one or more co-monomers into the loop reactor. The ingredients of the liquid phase may preferably also be fed to the loop reactor during subsequent steps b) and c) and,—as appropriate—during step d). In an embodiment, antifouling agent is introduced after step a) and before step c) i.e. before introduction of the catalyst. In another embodiment, antifouling agent is introduced after step c) i.e. after introduction of the catalyst.

According to an embodiment of the invention, in step c) the catalyst is introduced in the liquid phase when the concentration of antifouling agent is ranging from 0 to less than 0.3 ppm and preferably from 0 to less than 0.1 ppm in said liquid phase. Catalyst may preferably be added to the slurry during step d).

According to an embodiment, in a step e), the concentration of antifouling agent in the reactor is subsequently increased. Preferably, the concentration of antifouling agent is increased after addition of the catalyst, more preferably after olefin polymerization into polyolefin in the loop reactor has commenced and most preferably when polymerization conditions in the reactor have stabilized. Preferably, during step e), the concentration of antifouling agent in the reactor is increased and ranges preferably from 0.3 ppm more preferably from 0.5 ppm, most preferably from 1 ppm and preferably to 10 ppm, more preferably to 5 ppm, most preferably to 3 ppm.

For the purpose of this invention, "introduction" is defined as first addition to the reactor.

Surprisingly, the present inventors have found that presence of no or low levels of antifouling agent at initial introduction of the catalyst to the polymerization reactor results in quick start-up of the olefin polymerization reaction, reduced reactor down-time, high-quality end-product and/or reduced waste, in particular fines. Accordingly, after initiation and preferably stabilization of the polymerization reaction in the reactor, the concentration of antifouling agent in the loop reactor can be increased to prevent fouling.

The present invention relates to a process of preparing a polyolefin, preferably a polyethylene, in a loop reactor in the presence of antifouling agent, wherein said antifouling agent is introduced into the reactor at most 3 hours before or after first addition of the catalyst into said reactor.

Loop reactor suitable for said process comprises interconnected pipes, defining a reactor path, and an axial pump preferably comprising a motor, a shaft and an impeller, wherein said polymer slurry is circulated through said loop reactor by means of said pump.

As used herein, the term "polymerization slurry" or "polymer slurry" or "slurry" means substantially a multi-phase composition including at least polymer solids and a liquid phase, the liquid phase being the continuous phase. The solids include catalyst and a polymerized olefin, such as polyethylene. The liquids include an inert diluent, such as isobutane, dissolved monomer such as ethylene, co-monomer, molecular weight control agents, such as hydrogen, antistatic agents, antifouling agents, scavengers, and other process additives.

As used in the present invention, the term "antifouling agent" refers to material that prevents fouling of the inside of the reactor wall. In an embodiment, the antifouling agent is selected from cationic agents, anionic agents, nonionic agents, organometallic agents, polymeric agents or mixtures thereof.

Suitable examples of cationic agents can be selected from quaternary ammonium, sulfonium or phosphonium salts with long (preferably $C_{5-20}$) hydrocarbon chain, for examples chloride, sulfate, nitrate, or hydrogen phosphate salts thereof.

Examples of suitable anionic agents can be selected from sulfated oils, sulfated amide oils, sulfated ester oils, fatty alcohol sulfuric ester salts, alkyl sulfuric ester salts, fatty acid ethyl sulfonic acid salts, alkyl sulfonic acid salts (for example sodium alkyl sulfonates), alkylnaphthalene-sulfonic acid salts, alkylbenzene-sulfonic acid salts, phosphoric esters (for example alkyl phosphonates), alkyl phosphates, alkyl dithiocarbamate or mixtures thereof.

Examples of suitable nonionic agents can be selected from partial fatty acid esters of polyhydric alcohols; alkoxylated fatty alcohols such as ethoxylated or propoxylated fatty alcohols; polyethylene glycol (PEG) esters of fatty acids and alkylphenols; glyceryl esters of fatty acids and sorbitol esters; ethylene oxide adducts of fatty amines or fatty acid amides; ethylene oxide adducts of alkylphenols; ethylene oxide adducts of alkylnaphthols; polyethylene glycol, and fatty acid esters of alkyldiethanolamines, or mixtures thereof.

Examples of suitable organometallic agents can be selected from neoalkyl titanates and zirconates, or mixtures thereof.

Examples of suitable polymeric agents can be selected from polyoxyalkylenic compounds such as polyethylene glycol hexadecyl ether; ethylene oxide/propylene oxide copolymers; or mixtures thereof. For example, suitable ethylene oxide/propylene oxide copolymer antifouling agent can comprise one or more $—(CH_2—CH_2—O)_k—$ where each k is in the range from 1 to 50; and one or more $—(CH_2—CH(R)—O)_n—$ wherein R comprises an alkyl group having from 1 to 6 carbon atoms and each n is in the range from 1 to 50, and terminated by a R' and a R" end groups, wherein R' is OH or an alkoxy having from 1 to 6 carbon atoms and R" is H or an alkyl having from 1 to 6 carbon atoms. In an embodiment, the antifouling agent is a block polymer, more preferably a triblock polymer. In an embodiment, the antifouling agent is a block polymer of general formula:

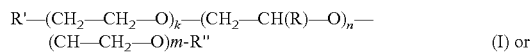 (I) or

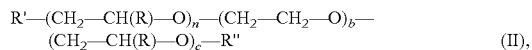 (II), wherein R comprises an alkyl group; R' and R" are end groups; k is from 1 to 50; n is from 1 to 50; m is greater than or equal to 1; a is from 1 to 50; b is from 1 to 50; and c is from 0 to 50; k and m and a and c may be the same or different. Preferably R is a C1 to C3 alkyl group. More preferably, R is a methyl group. Preferably, in one embodiment, k is greater than 1 and m is greater than 1. Also preferably, in another embodiment a is 0 or c is 0. Preferred R' and R" groups include H; OH; alkyl, and alkoxy groups. Preferred alkyl groups are C1 to C3 alkyl groups. Preferred alkoxy groups are C1 to C3 alkoxy groups. In formulae (I) and (II) above, it is preferred that R' is OH or an alkoxy group, preferably OH or a C1 to C3 alkoxy group. Further, it is preferred that R" is H or an alkyl group, preferably H or a C1 to C3 alkyl group. A particularly preferred polymer has general formula (III): R'—(CH$_2$—CH$_2$—O)$_k$—(CH$_2$—CH(CH$_3$)—O)$_n$—(CH$_2$—CH$_2$—O)$_m$—R" (III), wherein R', R", k, n, and m independently are as defined anywhere above. A further preferred polymer has general formula (IV): OH—(CH$_2$—CH$_2$—O)$_k$—(CH$_2$—CH(R)—O)$_n$—(CH$_2$—CH$_2$—O)$_m$—H (IV), wherein R, k, n, and m independently are as defined anywhere above. It will be appreciated that, by virtue of the preferred molecular weights for the antifouling agent and the preferred ethylene oxide contents in the present antifouling agent given above, preferred values for a, b, c, k, n, and m can be derived. Preferably, the weight percentage of ethylene oxide in the antifouling agent is in the range of from 5 to 40%, more preferably from 8 to 30%, even more preferably from 10 to 20%, most preferably about 10%. In an embodiment, the ethylene oxide/propylene oxide copolymer has a molecular weight (MW) greater than 1000 Daltons, preferably greater than 2000 Daltons, more preferably in the range from 2000-4500 Daltons.

Examples of suitable commercially available antifouling agents include those under the trade designation Armostat® (such as Armostate 300 (N,N-bis-(2-hydroxyethyl)-(C.sub.10-C.sub.20)alkylamine), Armostate 410 (bis(2-hydroxyethyl)cocoamine), and Armostat® 600 (N,N-bis(2-hydroxy-ethyl)alkylamine) from Akzo Nobel Corporation; those under the trade designation Atmere 163 (N,N-Bis(2hydroxy-ethyl) alkylamine) from ICI Americas; those under the trade designation Statsafe 6000 (dodecylbenzenesulfonic acid) from Innospec Limited; those under the trade designation Octastat® 3000 (about 40-50% toluene, about 0-5% propan-2-ol, about 5-15% DINNSA (dinonyinaphthasulphonic acid), about 15-30% solvent naptha, about 1-10% trade secret polymer containing N, and about 10-20% trade secret polymer containing S) from Octel Performance Chemicals; those under the trade designation Kerostate 8190 (about 10-20% alkenes (polymer with sulfur dioxide), about 3-8% benzenesulfonic acid (4-C10-13-sec-alkyl derivatives) and organic solvent from BASF, those under the trade designation Stadis® 450 (about 14 wt % of polybutene sulfate, about 3 wt % of aminoethanolepichlorohydrin polymer, about 13 wt % of alkylbenzenesulfonic acid, about 70 wt % of toluene and trace amounts of quaternary ammonium salt of aliphatic alkyl and propyl alcohol) from E.I. Du Pont de Nemours & Co.; Synperonic PEL121 (ethyleneoxide-propyleneoxide-ethyleneoxide block copolymer, about 10% of propyleneoxide, MW about 4400 Da) from Uniqema and the like.

Preferred examples of antifouling agents for use in the invention are Stadis 450, Statsafe 6000 and Synperonic PEL121. Stadis 450 and Statsafe 6000 are preferably used for Chromium and Ziegler-Natta catalysts. Synperonic PEL121 is particularly preferred for use with metallocene catalysts.

Preferably, anti-fouling agent is fed to the reactor as a composition with a solvent, preferably dissolved in a solvent. Preferably, the solvent is selected from C4-C10 aliphatic and olefin compounds. Preferably, the solvent is selected from unsaturated (olefin) C4-C10 compounds. In an embodiment, said solvent is selected from hexane, hexene, cyclohexane, or heptane. Most preferably, the solvent is hexene.

Preferably, the antifouling composition comprises from 0.1 to 50%, more preferably from 0.5 to 30%, most preferably from 1 to 10% by weight of antifouling agent.

According to the invention, the antifouling agent is added to the reactor at most 3 hours before or after introduction of the catalyst.

As used herein, the term "catalyst" refers to a substance that causes a change in the rate of a polymerization reaction without itself being consumed in the reaction. In the present invention, it is especially applicable to catalysts suitable for the polymerization of ethylene to polyethylene. These catalysts will be referred to as ethylene polymerization catalysts or polymerization catalysts. In the present invention it is especially applicable to ethylene polymerization catalysts such as metallocene catalysts, chromium catalysts and/or Ziegler-Matta catalysts, preferably metallocene catalyst.

In a preferred embodiment of the present invention, said catalyst is a metallocene catalyst. The term "metallocene catalyst" is used herein to describe any transition metal complexes consisting of metal atoms bonded to one or more ligands. The metallocene catalysts are compounds of Group IV transition metals of the Periodic Table such as titanium, zirconium, hafnium, etc., and have a coordinated structure with a metal compound and ligands composed of one or two groups of cyclo-pentadienyl, indenyl, fluorenyl or their derivatives. Use of metallocene catalysts in the polymerization of polyethylene has various advantages. The key to metallocenes is the structure of the complex. The structure and geometry of the metallocene can be varied to adapt to the specific need of the producer depending on the desired polymer. Metallocenes comprise a single metal site, which allows for more control of branching and molecular weight distribution of the polymer. Monomers are inserted between the metal and the growing chain of polymer.

In an embodiment, the metallocene catalyst has a general formula (I) or (II):

 (I); or

 (II)

wherein the metallocenes according to formula (I) are non-bridged metallocenes and the metallocenes according to formula (II) are bridged metallocenes;

wherein said metallocene according to formula (I) or (II) has two Ar bound to M which can be the same or different from each other;

wherein Ar is an aromatic ring, group or moiety and wherein each Ar is independently selected from the group consisting of cyclopentadienyl, indenyl, tetrahydroindenyl or fluorenyl, wherein each of said groups may be optionally substituted with one or more substituents each independently selected from the group consisting of halogen, a hydrosilyl, a $SiR^2_3$ group wherein $R^2$ is a hydrocarbyl having 1 to 20 carbon atoms, and a hydrocarbyl having 1 to 20 carbon atoms and wherein said hydrocarbyl optionally contains one or more atoms selected from the group comprising B, Si, S, O, F, Cl and P;

wherein M is a transition metal M selected from the group consisting of titanium, zirconium, hafnium and vanadium; and preferably is zirconium;

wherein each Q is independently selected from the group consisting of halogen; a hydrocarboxy having 1 to 20 carbon atoms; and a hydrocarbyl having 1 to 20 carbon atoms and wherein said hydrocarbyl optionally contains one or more atoms selected from the group comprising B, Si, S, O, F, Cl and P; and wherein $R^1$ is a divalent group or moiety bridging the two Ar groups and selected from the group consisting of a $C_1$-$C_{20}$ alkylene, a germanium, a silicon, a siloxane, an alkylphosphine and an amine, and wherein said $R^1$ is optionally substituted with one or more substituents each independently selected from the group consisting of halogen, a hydrosilyl, a $SiR^3_3$ group wherein $R^3$ is a hydrocarbyl having 1 to 20 carbon atoms, and a hydrocarbyl having 1 to 20 carbon atoms and wherein said hydrocarbyl optionally contains one or more atoms selected from the group comprising B, Si, S, O, F, Cl and P.

The term "hydrocarbyl having 1 to 20 carbon atoms" as used herein is intended to refer to a moiety selected from the group comprising a linear or branched $C_1$-$C_{20}$ alkyl; $C_3$-$C_{20}$ cycloalkyl; $C_6$-$C_{20}$ aryl; $C_7$-$C_{20}$ alkylaryl and $C_7$-$C_{20}$ arylalkyl, or any combinations thereof. Exemplary hydrocarbyl groups are methyl, ethyl, propyl, butyl, amyl, isoamyl, hexyl, isobutyl, heptyl, octyl, nonyl, decyl, cetyl, 2-ethylhexyl, and phenyl. Exemplary halogen atoms include chlorine, bromine, fluorine and iodine and of these halogen atoms, fluorine and chlorine are preferred.

Illustrative examples of metallocene catalysts comprise but are not limited to bis(cyclopentadienyl) zirconium dichloride ($Cp_2ZrCl_2$), bis(cyclopentadienyl) titanium dichloride ($Cp_2TiCl_2$), bis(cyclopentadienyl) hafnium dichloride ($Cp_2HfCl_2$); bis(tetrahydroindenyl) zirconium dichloride, bis (indenyl) zirconium dichloride, and bis(n-butyl-cyclopentadienyl) zirconium dichloride; ethylenebis(4,5,6,7-tetrahydro-1-indenyl) zirconium dichloride, ethylenebis(1-indenyl) zirconium dichloride, dimethylsilylene bis(2-methyl-4-phenyl-inden-1-yl) zirconium dichloride, diphenylmethylene (cyclopentadienyl)(fluoren-9-yl) zirconium dichloride, and dimethylmethylene [1-(4-tert-butyl-2-methyl-cyclopentadienyl)](fluoren-9-yl) zirconium dichloride.

The metallocene catalysts are preferably provided on a solid support. The support can be an inert solid, organic or inorganic, which is chemically unreactive with any of the components of the conventional metallocene catalyst. Suitable support materials for the supported catalyst of the present invention include solid inorganic oxides, such as silica, alumina, magnesium oxide, titanium oxide, thorium oxide, as well as mixed oxides of silica and one or more Group 2 or 13 metal oxides, such as silica-magnesia and silica-alumina mixed oxides. Silica, alumina, and mixed oxides of silica and one or more Group 2 or 13 metal oxides are preferred support materials. Preferred examples of such mixed oxides are the silica-aluminas. Most preferred is silica. The silica may be in granular, agglomerated, fumed or other form. The support is preferably a silica compound. In a preferred embodiment, the metallocene catalyst is provided on a solid support, preferably a silica support. In an embodiment, the catalyst for use in the present process is a supported metallocene-alumoxane catalyst consisting of a metallocene and an alumoxane which are bound on a porous silica support.

In another embodiment of the present invention, said catalyst is a chromium catalyst. The term "chromium catalysts" refers to catalysts obtained by deposition of chromium oxide on a support, e.g. a silica or aluminum support. Illustrative examples of chromium catalysts comprise but are not limited to $CrSiO_2$ or $CrAl_2O_3$.

In another embodiment of the present invention, said catalyst is a Ziegler-Natta catalyst. The term "Ziegler-Natta catalyst" or "ZN catalyst" refers to catalysts having a general formula $M^1X_v$, wherein $M^1$ is a transition metal compound selected from group IV to VII, wherein X is a halogen, and wherein v is the valence of the metal. Preferably, $M^1$ is a group IV, group V or group VI metal, more preferably titanium, chromium or vanadium and most preferably titanium. Preferably, X is chlorine or bromine, and most preferably, chlorine. Illustrative examples of the transition metal compounds comprise but are not limited to $TiCl_3$, $TiCl_4$. Suitable ZN catalysts for use in the invention are described in U.S. Pat. No. 6,930,071 and U.S. Pat. No. 6,864,207, which are incorporated herein by reference.

In an embodiment, the catalyst is added to the reactor as a catalyst slurry. As used herein, the term "catalyst slurry" refers to a composition comprising catalyst solid particles and a diluent. The solid particles can be suspended in the diluent, either spontaneously or by homogenization techniques, such as mixing. The solid particles can be non-homogeneously distributed in a diluent and form a sediment or deposit.

Optionally, activating agent is used in processes according to the invention. The term "activating agent" refers to materials that can be used in conjunction with a catalyst in order to improve the activity of the catalyst during the polymerization reaction. In the present invention, it particularly refers to an organo-aluminium compound, being optionally halogenated, having general formula $AlR^{11}R^{12}R^{13}$ r $AlR^{11}R^{12}Y$, wherein $R^{11}$, $R^{12}$, $R^{13}$ is an alkyl having from 1 to 6 carbon atoms and $R^{11}$, $R^{12}$, $R^{13}$ may be the same or different and wherein Y is hydrogen or a halogen, as disclosed in U.S. Pat. No. 6,930,071 and U.S. Pat. No. 6,864,207, which are incorporated herein by reference. Preferred activating agents are Tri-Ethyl Aluminum (TEAl), Tri-Iso-Butyl Aluminum (TIBAl), Tri-Methyl Aluminum (TMA), and Methyl-Methyl-Ethyl Aluminum (MMEAl). TEAl is particularly preferred. In an embodiment, the activating agent is added to the loop reactor in an activating agent slurry at a concentration of less than 90% by weight of the activating agent slurry composition, more preferably from 10 to 50% by weight, for instance around 20% by weight. Preferably, the concentration of the activating agent in the loop reactor is lower than 200 ppm, more preferably from 10 to 100 parts per million, most preferably from 20-70 ppm and for instance around 50 ppm.

As used herein, the term "monomer" refers to olefin compound that is to be polymerized. Examples of olefin monomers are ethylene and propylene. Preferably, the invention is directed to ethylene.

As used herein, the term "diluent" refers to diluents in a liquid state, liquid at room temperature and preferably liquid under the pressure conditions in the loop reactor.

Diluents which are suitable for being used in accordance with the present may comprise but are not limited to hydrocarbon diluents such as aliphatic, cycloaliphatic and aromatic hydrocarbon solvents, or halogenated versions of such solvents. The preferred solvents are C12 or lower, straight chain or branched chain, saturated hydrocarbons, C5 to C9 saturated alicyclic or aromatic hydrocarbons or C2 to C6 halogenated hydrocarbons. Non-limiting illustrative examples of solvents are butane, isobutane, pentane, hexane, heptane, cyclopentane, cyclohexane, cycloheptane, methyl cyclopentane, methyl cyclohexane, isooctane, benzene, toluene, xylene, chloroform, chlorobenzenes, tetrachloroethylene, dichloroethane and trichloroethane. In a preferred embodiment of the present invention, said diluent is isobutane. However, it should be clear from the present invention that other diluents may as well be applied according to the present invention.

Suitable ethylene polymerization includes but is not limited to homopolymerization of ethylene, copolymerization of ethylene and a higher 1-olefin co-monomer.

As used herein, the term "co-monomer" refers to olefin co-monomers which are suitable for being polymerized with ethylene monomers. Co-monomers may comprise but are not limited to aliphatic C3-C20 alpha-olefins. Examples of suitable aliphatic C3-C20 alpha-olefins include propylene, 1-butene, 1-pentene, 4-methyl-1-pentene, 1-hexene, 1-octene, 1-decene, 1-dodecene, 1-tetradecene, 1-hexadecene, 1-octadecene and 1-eicosene. The term "co-polymer" refers to a polymer, which is made by linking two different types of in the same polymer chain. The term "homo-polymer" refers to a polymer which is made by linking ethylene monomers, in the absence of co-monomers. In an embodiment of the present invention, said co-monomer is 1-hexene.

In a preferred embodiment, reactants comprising the monomer ethylene, isobutane as hydrocarbon diluent, a catalyst, at least one antifouling agent, the co-monomer 1-hexene are used.

The polymerization can be performed over a wide temperature range. Preferably, the temperature is within the range of about 0° C. to about 110° C. A more preferred range is from about 60° C. to about 100° C., more preferably from about 80 to 110° C., The reactor pressure is preferably held between 20 and 100 bar, 30 to 50 bar, more preferably at pressure of 37 to 45 bar. In an embodiment, the slurry flow can be set between 5 and 15 m/s.

The following non-limiting example illustrates the invention.

EXAMPLE

Example 1

At start-up of the polymerization process, ethylene monomer, comonomer, a metallocene catalyst, hydrogen, activating agent and about 2 t/h isobutane are fed in a single loop reactor. An axial pump is used to pump around the resulting slurry. 10 g/h of an anti-fouling composition comprising 2.5% of Synperonic PEL121 anti-fouling agent dissolved in hexene is introduced into the reactor. After 10 min, a metallocene catalyst is introduced under 200-240 kg/h isobutane.

Catalyst fines production is limited and the reactor is quickly stabilized for production of polyethylene.

Example 2

Figure 2:
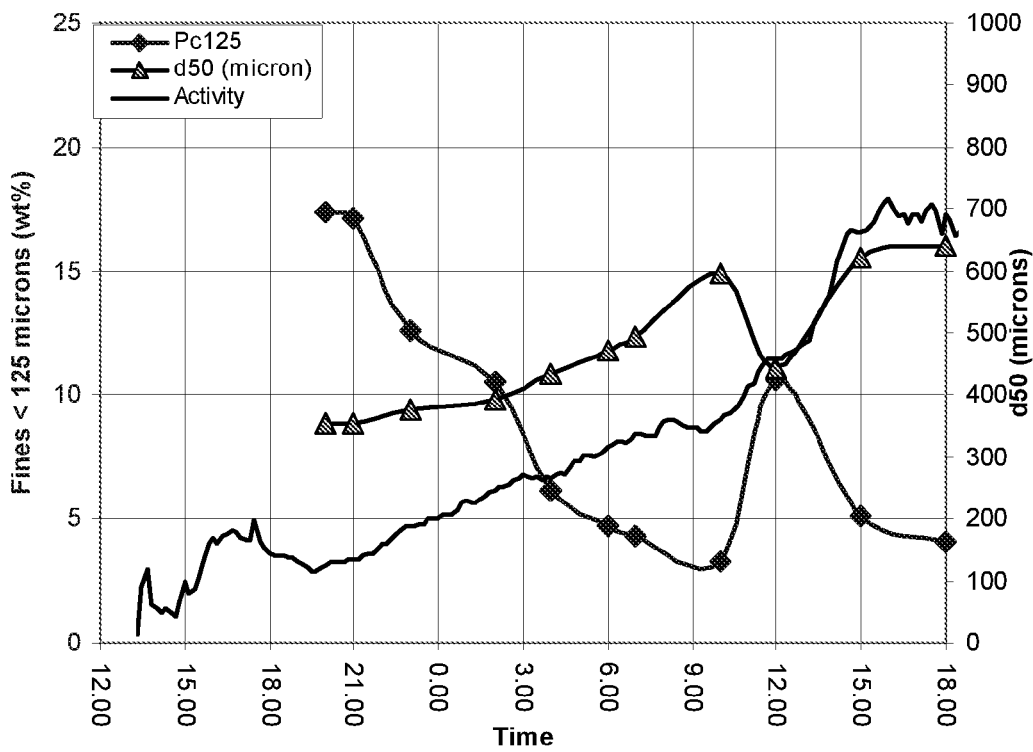
FIG. 2 represents a graph plotting fines (below 125 μm) (in wt %), particle size (D50 in μm) and activity as a function of time for a polymerization reaction wherein the antifouling agent was injected 6 hours before the start of the catalyst injection.

Experiment 1: At start-up of a polymerization process in a slurry loop reactor, ethylene monomer, comonomer, hydrogen, activating agent and isobutane were fed in a single loop reactor. An axial pump was used to pump around the resulting slurry. An anti-fouling composition was introduced into the reactor. 6 hours after the introduction of the anti-fouling agent, a metallocene catalyst was introduced into the reactor. The flow of antifouling agent and catalyst as a function of time was monitored and is shown in FIG. 1. The percentages of particles with a particle size below 125 μm (also referred as fines) were measured together with the average particle size D50. The activity of the catalyst was also monitored during the polymerization reaction. The D50 is defined as the particle size for which fifty percent by weight of the particles has a size lower than the D50, which is measured by sieving. The results are shown in FIG. 2. FIG. 2 shows fines generation and slow activity growth due to the fact that anti-fouling agent was injected for about 6 hours before adding the metallocene catalyst. Time to obtain correct morphology and nominal activity was more than 24 hours.

Figure 3:
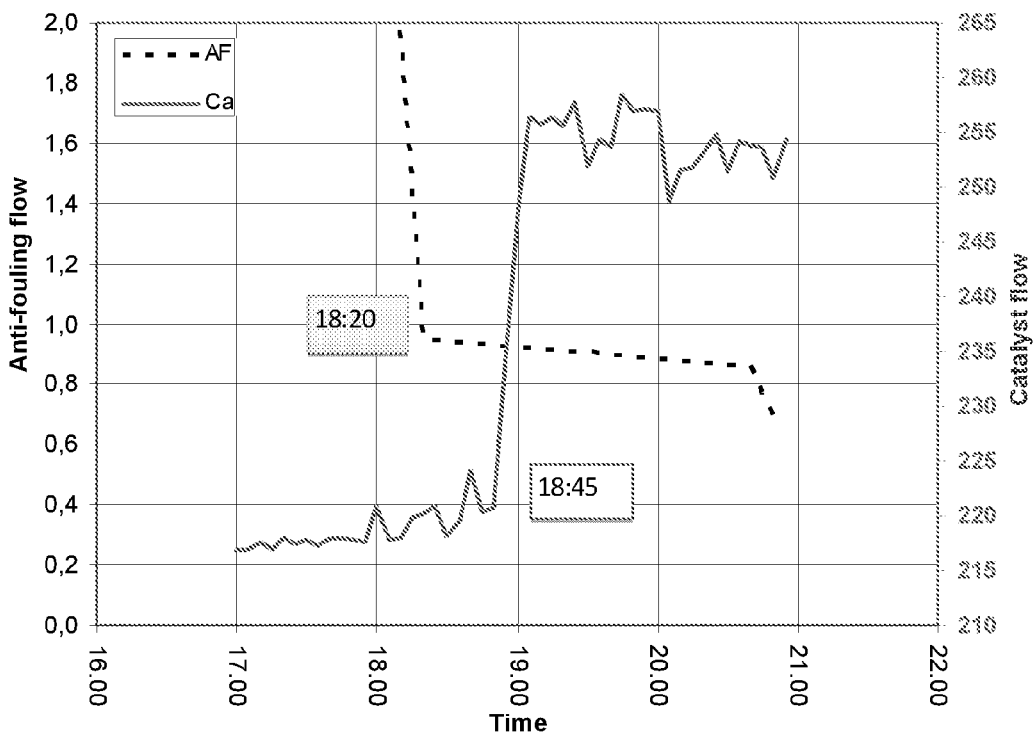
FIG. 3 represents a graph plotting the flow of catalyst and antifouling agent as a function of time in a polymerization process according to an embodiment of the invention wherein the antifouling agent was injected 25 min before the start of the catalyst injection.
Figure 4:
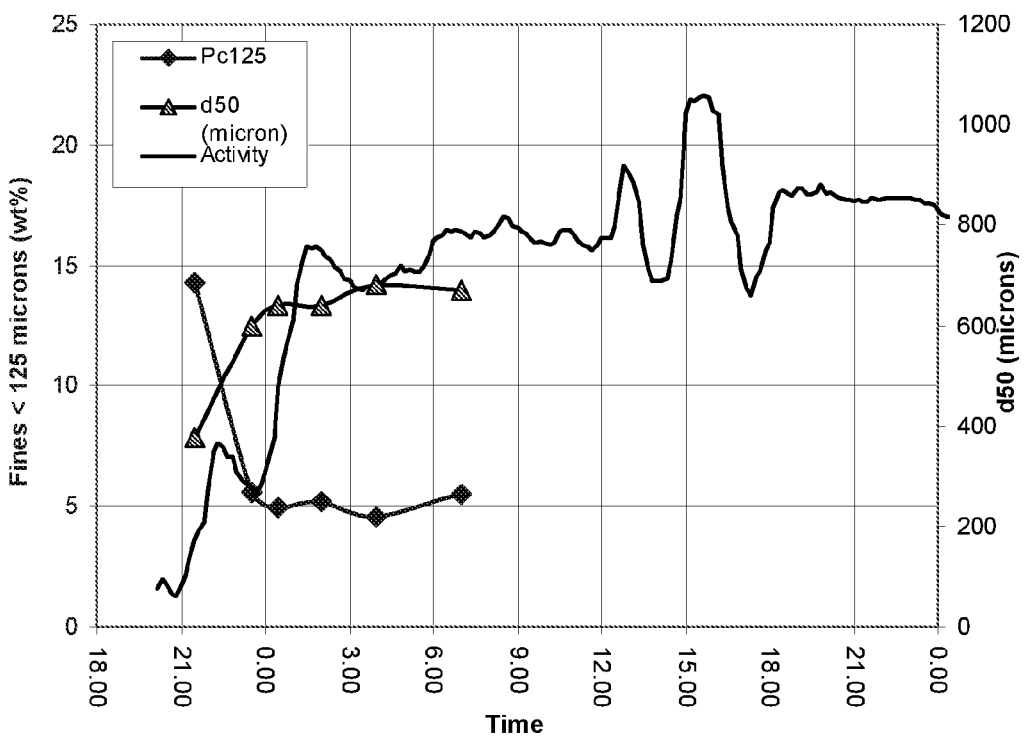
FIG. 4 represents a graph plotting fines (<125 μm) in wt %, particle size (D50 in μm) and activity as a function of time for a polymerization reaction wherein the antifouling agent was injected 25 min before the start of the catalyst injection.

Experiment 2: At start-up of a polymerization process in a slurry loop reactor, ethylene monomer, comonomer, hydrogen, activating agent and isobutane were fed in a single loop reactor. An axial pump was used to pump around the resulting slurry. An anti-fouling composition was introduced into the reactor. 25 min after the introduction of the anti-fouling agent, a metallocene catalyst was introduced into the reactor. The flow of antifouling agent and catalyst as a function of time was monitored and is shown in FIG. 3. The percentages of particles with a particle size below 125 μm (also referred as fines) were measured together with the average particle size D50. The activity of the catalyst was also monitored during the polymerization reaction. The results are shown in FIG. 4. As shown in FIG. 4, and compared to experiment 1 less fines are generated and nominal activity was rapidly reached thanks to the start-up of anti-fouling agent only 25 min before the catalyst injection. After 4 to 5 hours, correct morphology and activity was obtained.

What is claimed is:

1. A process of preparing polyethylene in a loop reactor in the presence of antifouling agent comprising:
   feeding into said loop reactor diluent, monomers, optionally hydrogen, and optionally one or more co-monomers to produce a liquid phase;
   introducing a catalyst and an antifouling agent into said loop reactor, wherein the antifouling agent is introduced into said loop reactor either before or after the catalyst is introduced into said loop reactor;
   wherein introduction of said catalyst into the liquid phase produces a slurry; and
   polymerizing the monomers and optional co-monomers to form the polyethylene, characterized in that a time difference between the introduction of the antifouling agent and the introduction of the catalyst is at most 3 hours, and wherein either:
   the antifouling agent is introduced in said loop reactor at most 3 hours before and at least 1 minute before the introduction of the catalyst in the liquid phase, or
   the antifouling agent is introduced in said loop reactor at least 1 minute after and at most 1 hour after the introduction of the catalyst in said liquid phase.

2. The process according to claim 1, wherein said polyethylene is produced in slurry conditions.

3. The process according to claim 1, wherein the catalyst is introduced into the liquid phase when a concentration of the antifouling agent ranges from 0 to less than 0.3 ppm.

4. The process according to claim 1, further comprising after the polymerizing of the monomers and optional co-monomers to form the polyethylene has commenced, increasing a concentration of the antifouling agent to range from 0.5 to 5 ppm.

5. The process according to claim 1, wherein the antifouling agent is selected from cationic agents, anionic agents, nonionic agents, organometallic agents, polymeric agents or mixtures thereof.

6. The process according to claim 1, wherein the catalyst is a metallocene catalyst.

\* \* \* \* \*